United States Patent
Nelson et al.

(10) Patent No.: US 6,385,997 B1
(45) Date of Patent: May 14, 2002

(54) METHOD FOR FORMING A TOOL FOR MOLDING MICROLENS ARRAYS

(75) Inventors: Jayson J. Nelson, Webster; Eugene G. Hill, Rochester; Paul O. McLaughlin, Rochester; John C. Pulver, Rochester; Michael K. Budinski, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/570,609

(22) Filed: May 12, 2000

(51) Int. Cl.[7] ................................................ C03B 23/26
(52) U.S. Cl. ..................... 65/64; 65/37; 65/39; 65/63; 65/102; 65/111; 65/306; 264/2.5; 264/219
(58) Field of Search .............................. 65/37, 39, 63, 65/64, 111, 102, 306; 264/2.5, 219

(56) References Cited

U.S. PATENT DOCUMENTS

| | | | |
|---|---|---|---|
| 4,243,618 A | | 1/1981 | Van Arnam |
| 4,738,703 A | | 4/1988 | Izumitani et al. |
| 5,276,538 A | | 1/1994 | Monji et al. |
| 5,298,366 A | | 3/1994 | Iwasaki et al. |
| 5,300,263 A | | 4/1994 | Hoopman et al. |
| 5,340,374 A | * | 8/1994 | Komiyama et al. |
| 5,344,476 A | * | 9/1994 | Tomida |
| 5,346,522 A | * | 9/1994 | Komiyama et al. |
| 5,507,806 A | | 4/1996 | Blake |
| 5,536,455 A | | 7/1996 | Aoyama et al. |
| 5,623,368 A | | 4/1997 | Calderini et al. |
| 6,305,194 B1 | * | 10/2001 | Budinski et al. |

* cited by examiner

Primary Examiner—Michael Colaianni
(74) Attorney, Agent, or Firm—Mark G. Bocchetti

(57) ABSTRACT

A method for fabricating a mold tool for molding optical elements is taught which comprises heating a mold tool blank made from a vitreous material to a temperature above the glass transition temperature of the vitreous material; generating an axial viscosity gradient in the mold tool blank; pressing a punch into an optical quality mold surface of the mold tool blank, the punch including a pressing surface with a predetermined geometry for forming an optical feature; cooling the mold tool blank to a temperature below the glass transition temperature of the material; and removing the punch from the mold tool blank thereby creating the optical feature in the optical quality mold surface. The axial viscosity gradient is achieved by creating an axial thermal gradient. Multiple optical features can be formed in the mold surface of the blank using a single punch such that the pressing, cooling and removing steps are repeated with the punch or the blank being translated to a different position between the last removing step and the next pressing step. In such manner, a high temperature glass mold tool can be formed which can be used to mold glass optical elements either individually or in arrays.

20 Claims, 6 Drawing Sheets

METHOD FOR FORMING A TOOL FOR MOLDING MICROLENS ARRAYS

FIELD OF THE INVENTION

The present invention relates generally to molding of glass optics and, more particularly, to the fabrication of molding tools by coining methods at elevated temperatures, and the use of such tools in the molding of glass lenses and lens arrays.

BACKGROUND OF THE INVENTION

Coining methods have long been used to reproduce features onto surfaces for a variety of applications. For example, U.S. Pat. No. 4,243,618 to Van Arnam describes a method for forming retroreflective sheeting having a plurality of retroreflective cube-corner prisms distributed over one of its surfaces such that the prisms are disposed in a planar array. The method comprises clamping a plurality of pins together such that the ends of the pins form a substantially planar surface, in scribing the planar surface for forming thereon a continuous pattern of solid trigonal pyramids with internal dihedral angles of ninety degrees, releasing the bundle of pins and rotating the individual pins for changing the angular orientation of the formed trigonal pyramids on adjacent pins re-clamping the pins together and using the inscribed surface of the bundle of pins for forming a mold, containing cube-corner prism cavities, and producing prismatic retroreflective sheeting by embossing, molding or casting in such mold. Van Arnam focuses on eliminating problems associated with orientation and the creation of a planar surface from the pre-assembled array. The materials being molded here are either monomer or polymer in nature, and the embossing is done at or near room temperature (20° C.). Suitable mold tool materials listed are "copper, brass, aluminum, hard plastic, hard rubber, and the like." The coining tool is an array of individual tools, each one having an optical surface machined onto its surface. The act of holding a large group of pins together to maintain a planar surface of any accuracy that is determined by aligning the vertex points from a number of individual spheres presents a considerable problem. Also, the need to reliably machine identical precision features into a number of tools adds considerable cost and effort to the process.

U.S. Pat. No. 5,623,368 to Calderini describes a method for the manufacture of a micolens sheet in which a plate of deformable optical material is pressed against an undeformable furrowed surface in such a manner that neither the convex surfaces of the microlenses nor the surface of the plate of optical material that is opposite the one that bears the microlenses enter into contact with surfaces able to alter them. In essence, the lens surfaces are free formed in this stamping operation which controls only the overall size and shape of the lens. This manner of forming the lens surface precludes the formation of complex shapes such as aspheres, torics, or other desired geometries. The mold tool itself is manufactured by conventional engraving and masking techniques.

U.S. Pat. No. 5,298,366 to Iwasaki et al. describes a method of producing a microlens array and the necessary tooling, and in particular, the inverted master tool used in the process. The mold tool is made of a resist material and the optical surfaces are formed by heating an intermediate material and thereby smoothing the surfaces of the projections. The mold tool is then used to stamp out the finished lens arrays. Again, the surfaces are formed by inexact methods and rely on surface tension between the material and its surroundings to generate the optical form. This optic can only be spherical at best, and the materials used would not endure very high temperatures.

The above patents state either directly or implicitly that their intended use is with plastic materials or a suitable low melting point glass. This is also evidenced by their choice of tooling materials, most of which could not withstand the high temperatures encountered in molding high temperature glasses without experiencing some sort of degradation. Also, in each of these methods where coining or stamping is used to produce the mold tool, a problem arises that is symptomatic to every stamping operation. A basic physical law is that of conservation of mass, which here suggests that when a volume of material is displaced from one region of an object, a comparable volume of material must appear in another region. For homogeneous materials of constant stiffness, this naturally occurs at a point near the displacement, which in the case of forming small microlenses, is evidenced by a ridge or mushroom effect around the circumference of the impression. This may be overcome by pressing down to a flat portion on the coining mandrel and exerting a high level of force to displace the material away from the feature. The problems here are twofold. First, the force needed to planarize the piece may be excessive and cause other problems such as high internal stresses to develop in the tool. Also, the set up of such a tool is very costly if the depth of the feature is to be held with any precision, as is generally required in optical applications. One way to overcome this mushrooming problem is to planarize the mold tool through a secondary operation after the coining is done, but this is expensive as well and may cause material to flow back into the feature upon machining. Therefore, an effective and economical method for manufacturing mold tools with complex optical features is needed that will withstand the harsh environmental conditions associated with high temperature glass molding and will replicate without flaw the precise geometries required.

SUMMARY OF THE INVENTION

It is therefore an object of the present invention to provide a method for the fabrication of a molding tool that contains high precision optical features for molding arrays of optical elements.

It is a further object of the present invention to provide a method for the fabrication of a molding tool that can be used for molding high temperature glass optics.

Yet another object of the present invention is to provide a method for the fabrication of a mold tool by coining which obviates mushrooming of the surface of the mold tool.

Briefly stated, the foregoing and numerous other features, objects and advantages of the present invention will become readily apparent upon the reading of the description, claims and drawings set forth herein. These features, objects and advantages are accomplished by forming a molding tool blank out of a suitable glass, providing an optical quality polished surface on the face of the molding tool blank whereon the optical features are to be impressed, forming an indenter tool or punch with a predetermined optical surface geometry which is the negative of the optical features/elements to be formed with mold tool, coating the optical surface of the indenter tool or punch with a release coating, creating an axial viscosity gradient in the tool blank by heating the mold tool blank in order to generate an axial thermal gradient therein, pressing the indenter tool or punch into the heated mold tool blank to thereby form a desired optical feature in the surface of the mold tool blank, cooling the tool blank and removing the indenter tool or punch from the mold blank. The process steps of creating an axial viscosity gradient in the tool blank by heating the mold tool blank, pressing the indenter tool or punch into the heated mold tool blank to thereby form a desired optical feature in the surface of the mold tool blank, cooling the tool blank, and removing the indenter tool or punch from the mold blank are practiced in a non-oxidizing environment. As mentioned above, each indenter tool is fabricated to have the negative of a predetermined optical surface geometry. That geometry may be spherical, aspherical, or an otherwise complex geometry. If it is desired to produce a mold tool for molding an array of integrally formed optical elements, the indenter tool or punch or the tool blank is repositioned and the axial viscosity gradient in the tool blank is re-established. The indenter can then be pressed again into the surface of the tool blank. In such manner, a plurality of identical optical features can be produced in the surface of the tool blank. Or, alternatively, different indenter tools can be used to form an array of individual and/or different optical features in a single mold tool surface. In either case, a mold tool formed with the method of the present invention can be used to mold integral arrays of optical elements which can then be cut into individual optical elements as desired.

The method of the present invention uses a vitreous material for the mold tool. The viscosity of the vitreous material is dependent on some other parameter that can be regulated. By controlling the viscosity gradients in the vitreous material, the shape of the feature being generated can be closely controlled without adding secondary operations such as planarizing after the forming process in order to provide a planar surface where the forming process has caused deformation to occur. This is usually done by grinding and polishing of the glass, which can add considerable cost to the tool. The present invention uses differential heating of the mold tool blank to thereby control its viscosity along an axial direction and consequently eliminate some of the problems noted above. With the present invention, the displaced material is caused to flow away from the impression point and to a region where the viscosity is low enough to permit fluid movement. This is achieved by causing the temperature at the base of the tool to be higher than the temperature at the insertion point. The viscosity must be low enough at the point of insertion so as to allow replication of the glass without chipping, yet high enough to cause the material to flow away from the lens-forming region. However, if the viscosity is too low at the insertion point, the material will sag or be pulled in by adhesive forces as the glass encounters the coining tool, which also results in unacceptable deformation in the region immediately surrounding the desired features. The present invention again differs from the aforementioned works since it can be performed at an elevated temperature (≡1000° C.) depending on the glass used. Proper material choice is essential to success, such that the transformation temperature of the mold tool is sufficiently greater than the molding temperature of the finished product. Also of great importance is the application of appropriate coatings to the mold tool that will adhere to the tool at high temperatures while also acting as a release coating to the glass being molded into lenses.

The method of the present invention is intended for fabricating mold tools for molding micro-optical elements. The term "micro-optical elements" as used herein is intended to mean optical elements such as lenses having a maximum diameter of not more than about one millimeter. Thus, the indenter tool is used to form depressions in the mold tool preform where the individual depressions have a maximum diameter of not more than about one millimeter. In addition, the depressions formed should have a depth/diameter ratio of not more than about 0.2. For example, if a depression is formed having a diameter of about 350 microns, then the depth of the depression should be no more than about 70 microns.

DETAILED DESCRIPTION OF THE INVENTION

Figure 1:
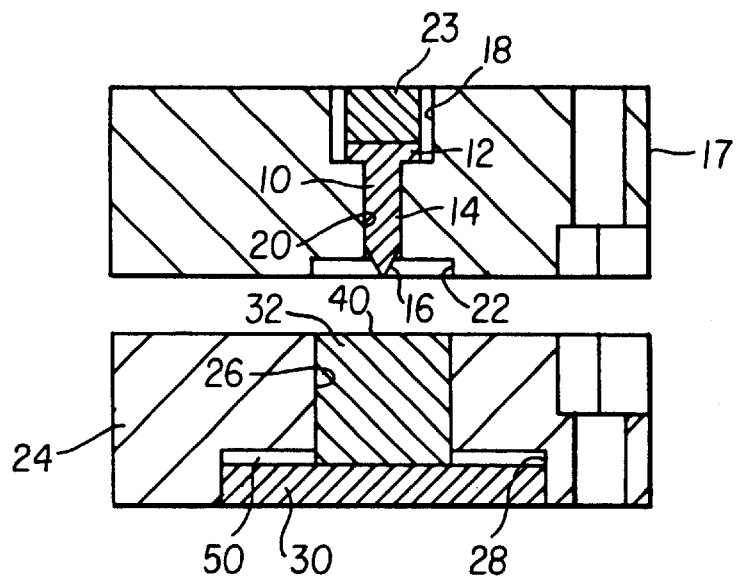
FIG. 1 is a cross-sectional view of the mold assembly used in the process of the present invention for forming the optical features into the mold tool blank.

Turning first to FIG. 1, there is shown a cross-sectional view of the mold assembly used in the process of the present invention for forming the optical features into the mold tool. The mold assembly includes an indenter tool or punch 10 made of a sufficiently hard material and possessing a fine grain structure, such as CVD silicon carbide or tungsten carbide. Other materials that can be used for punch 10 include molybdenum, sapphire, CrNi steel, silicon, and hard carbon sometimes referred to as amorphous diamond. The indenter tool or punch 10 includes a flange portion 12, a shank portion 14, and an optical quality pressing surface 16. The optical quality surface 16 is formed to a desired and predetermined high precision profile such as by diamond turning and polishing, or by diamond grinding and polishing. As those skilled in the art will recognize, the method used to achieve the desired and predetermined high precision profile is a function of the material from which punch 10 is made. The optical quality surface 16 of the indenter tool or punch 10 is coated with an appropriate thin film to protect the base material and to serve as a release agent from the hot glass encountered during molding. A typical coating may be of the titanium aluminide family, such as TiAlN, boron nitride (BN), platinum (Pt), tantalum (Ta), rhenium (Re), osmium (Os), or hafnium (Hf) based alloys, or composites formed with these materials which have been applied with a physical vapor deposition (PVD) or other appropriate process.

The indenter tool or punch 10 is supported in an upper mold support 17. Upper mold support 17 includes a flange bore 18, a shank bore 20, and a preform bore 22 which are all substantially cylindrical and co-axial with one another. Depending upon the dimensions of flange bore 18 and flange 12, the backup spacer element 23 may be used to retain indenter tool or punch 10 in a fully inserted position in upper mold support 17. There is a lower mold support 24 residing beneath upper mold support 17. Lower mold support 24 has formed therein a preform bore 26 and the support plate bore 28. Slidably residing in support plate bore 28 is support plate 30. Slidably residing within preform bore 26 is mold tool blank 32 with the mold tool blank 32 being supported on support plate 30. The mold tool blank 32 includes a mold surface 40 into which indenter tool or punch 10 is inserted as will be described more fully hereinafter. There are means (not shown) for driving upper mold support 17 toward lower mold support 24, or for driving lower mold support 24 toward upper mold support 17, or both. The optical quality surface 16 of the indenter tool or punch 10 extends through preform bore and beyond the bottom of upper mold support 17. Preform bore 22 ensures that that when indenter tool or punch 10 is driven into contact, no portion of the upper mold support 17 contacts mold surface 40.

Figure 2:
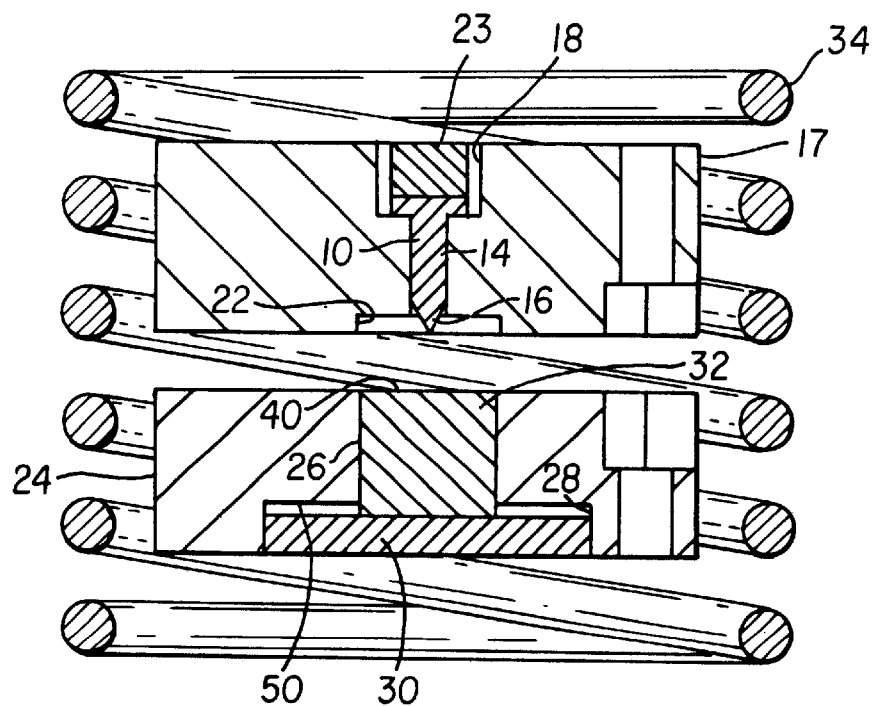
FIG. 2 is a cross-sectional view of the mold assembly used in the process of the present invention for forming the optical features into the mold tool blank and includes an induction heating coil as the heat source.
Figure 3:
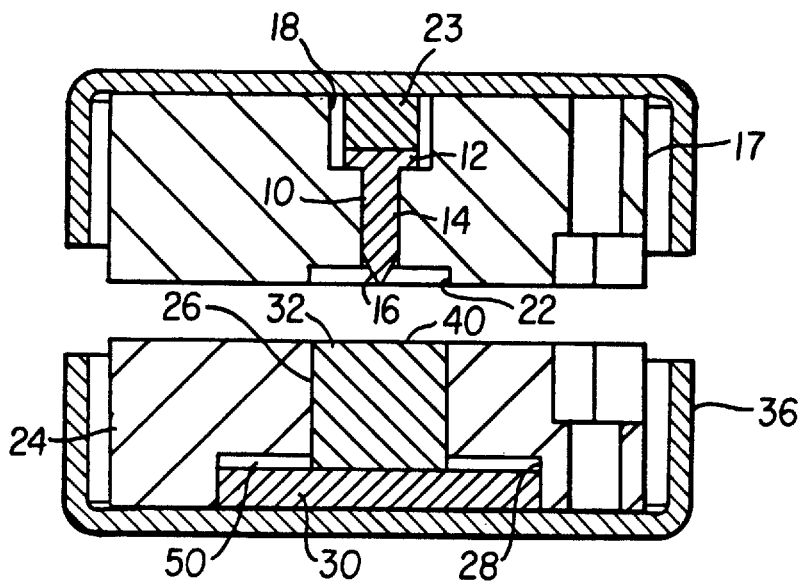
FIG. 3 is a cross-sectional view of the mold assembly used in the process of the present invention for forming the optical features into the mold tool blank and includes a resistance heater as the heat source.
Figure 4:
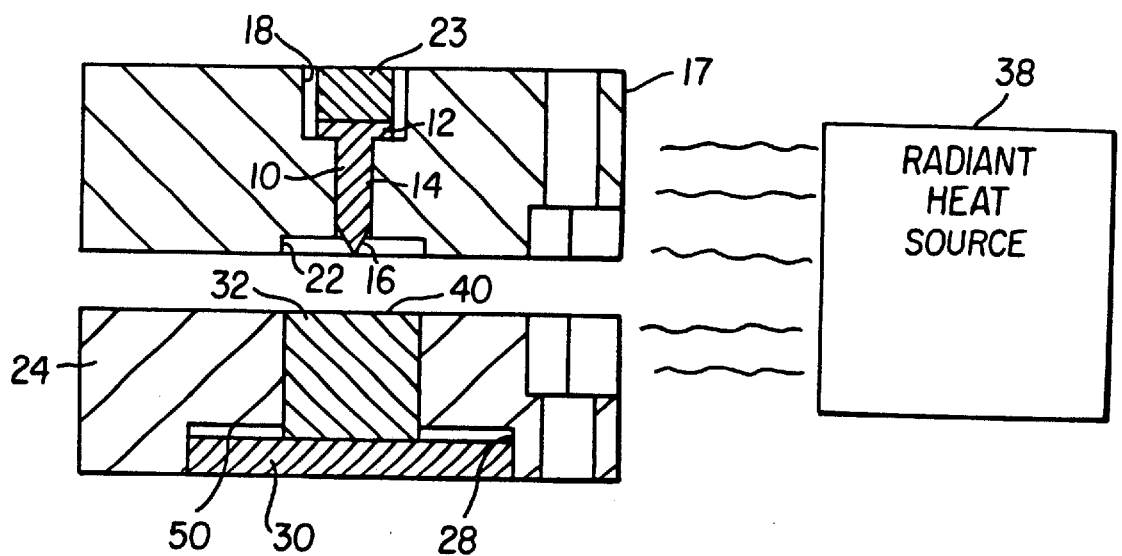
FIG. 4 is a cross-sectional view of the mold assembly used in the process of the present invention for forming the optical features into the mold tool and includes a radiant heater as the heat source.

The upper and lower mold supports 17, 24 are used in conjunction with a heat source. A variety of different heat sources can be used. For example, as depicted in FIG. 2, the heat source can be an induction heating coil 34. Alternatively, as depicted in FIG. 3, the heat source can be a resistance heater module 36; or, as depicted in FIG. 4, the heat source can be a radiant heater 38. The heat source is used to generate an axial thermal gradient in the mold tool blank 32. With the induction heating coil 34, an RF generator (not shown) is used to create a magnetic field. The induction heating coil 34 acts as a solenoid creating a magnetic field within its boundaries. The magnetic field strength varies radially but is constant through all angles for any given radius. The magnetic field strength also varies axially and it is this property of the solenoid that allows for the differential heating of the mold tool blank 32.

In the case of the resistive heaters and radiative heat sources, the heat source acts upon the cylindrical mold tool blank 32 from one end only, thereby producing the axial temperature gradient. The amount of thermal gradient is determined, to some degree, by the duration of time that the heat is allowed to influence the system. As the soak time is increased, the thermal gradient decreases, until a steady state condition is achieved and the thermal gradient remains constant. This steady state condition may or may not be desirable in the practice of the process of the present invention, as the specific molding conditions are heavily dependant on the geometry of the tools. In other words, with the heat source acting on the cylindrical mold tool blank 32 from one end, there would always exist a thermal gradient in the material due to the thermal conductivity of the mold tool blank 32 and the heat lost to its surroundings. However, since the mold tool blank 32 in this case is usually surrounded by some support fixtures, which also heat up and act as heat sources to the mold tool blank 32, the thermal gradient would be changed, and possibly eliminated given enough time. Further, long slender mold tool blanks 32 with properly chosen support structures would exhibit different characteristics than those evidenced by short, stubby mold tool blank 32 in the same surroundings, and so tool geometry and support structure materials will affect the process.

Upper and lower mold supports 17, 24 are used to facilitate mounting of the mold tool blank 32 in the heater structure and to act as a magnetic susceptor for the mold tool blank 32, since glass is a dielectric material. These mold supports 17, 24 should be made of materials having good thermal conductivity properties, and which can also withstand the high molding temperatures encountered in the practice of the process of the present invention. When the heat source is an induction heating coil 34, the mold supports 17, 24 should be made of materials that are also electrically conductive (such as carbon graphite). Similarly, when the heat source is an induction heating coil 34, the support plate 30, directly below the mold tool blank 32, should also be made of materials (such as carbon graphite) that have good electrical and thermal conductivity properties, and can also withstand the high molding temperatures encountered in the practice of the process of the present invention. The support plate 30 again functions as a susceptor in the magnetic field and adds to the creation of the axial viscosity gradient by serving as a heat source at the base of the mold tool blank 32.

The length of the mold tool blank 32 and its axial placement in the coil 34 determine the amount of temperature variation to be produced. The magnetic field is strongest in the center of the coil 34 and may vary considerably when measured near the ends of the coil 34, where fringing fields dominate.

Figure 5:
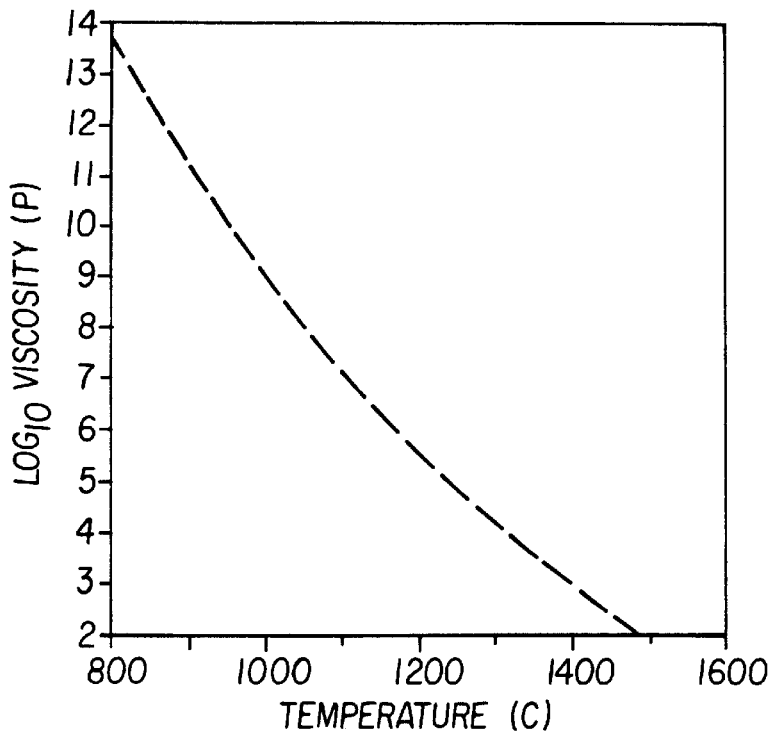
FIG. 5 is a graph plotting the log of the viscosity versus the temperature for an exemplary glass having a "long" temperature/viscosity curve.
Figure 6:
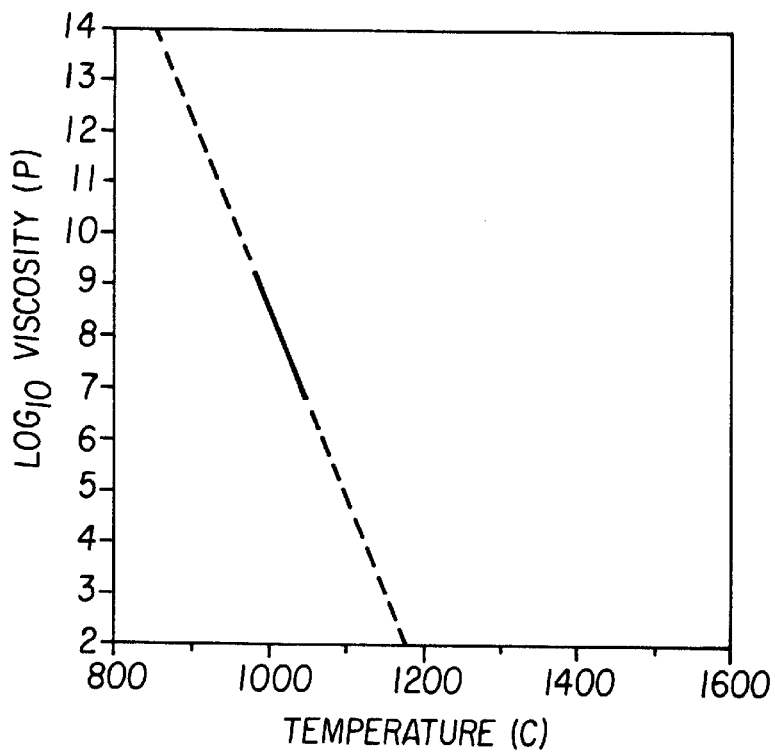
FIG. 6 is a graph plotting the log of the viscosity versus the temperature for an exemplary glass having a "short" temperature/viscosity curve.

In the practice of the method of the present invention the indenter tool or punch 10 is pressed into the mold tool blank 32 at an elevated temperature and in a non-oxidizing environment. Understanding that the mold tool blank 32 made with the process of the present invention is ultimately used to mold optical elements such as lenses in subsequent operations, the material from which the mold tool blank 32 is made must be able to withstand the high temperatures required to mold glass lenses with its surface. This means that the viscosity of the mold tool made from mold tool blank 32 should be at least about $10^{14}$ poise at the temperature where the lens molding is performed. This is because the annealing temperature for glass, defined as the point at which internal stresses are relieved in about 15 minutes, occurs when the viscosity reaches $10^{13}$ poise. At this temperature, glass has a very low fluidity and its dimensional stability is good enough for many purposes. For most glass molding applications, it is desirable that the glass possess a "long" temperature/viscosity curve. This is evidenced when a relatively large temperature change produces a small viscosity change, and allows the molder a greater range in which to work successfully. An exemplary glass having a "long" temperature/viscosity curve is shown in FIG. 5, which is a graph plotting the log of the viscosity versus the temperature. In contrast to this, a graph of a "short" glass, that is, a glass having a "short" temperature/viscosity curve is shown in FIG. 6. This type of glass is difficult to work with given its strong viscosity/temperature profile, although it will still perform well if the proper controls are maintained. The glass used for this present invention was from the aluminosilicate family and was characterized by a viscosity/temperature curve similar to that shown in FIG. 5. The preferred glass for mold tool blank 32 is an yttria aluminosilicate glass. Other glasses such as, for example, alumino-silicate glasses with a higher than normal levels of silica can also be used in the practice of the present invention.

Figure 7:
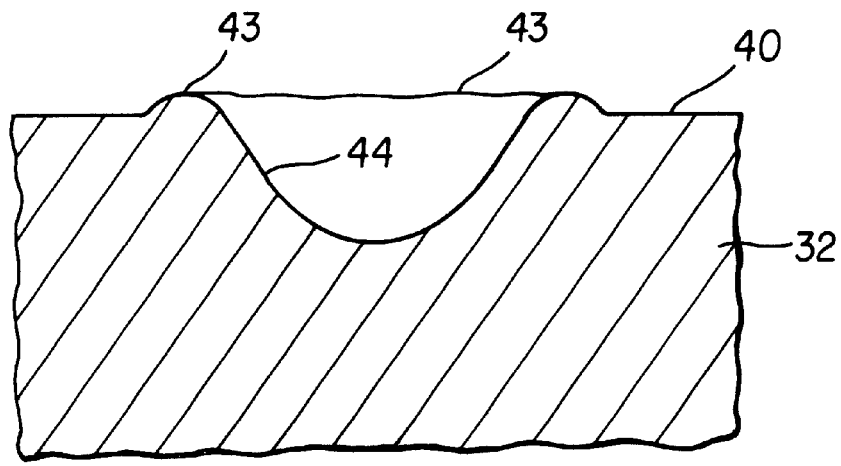
FIG. 7 is a cross-sectional sketch of an optical feature formed with a mushrooming defect in the mold surface about the periphery of the optical feature resulting from molding with a constant axial viscosity.
Figure 8:
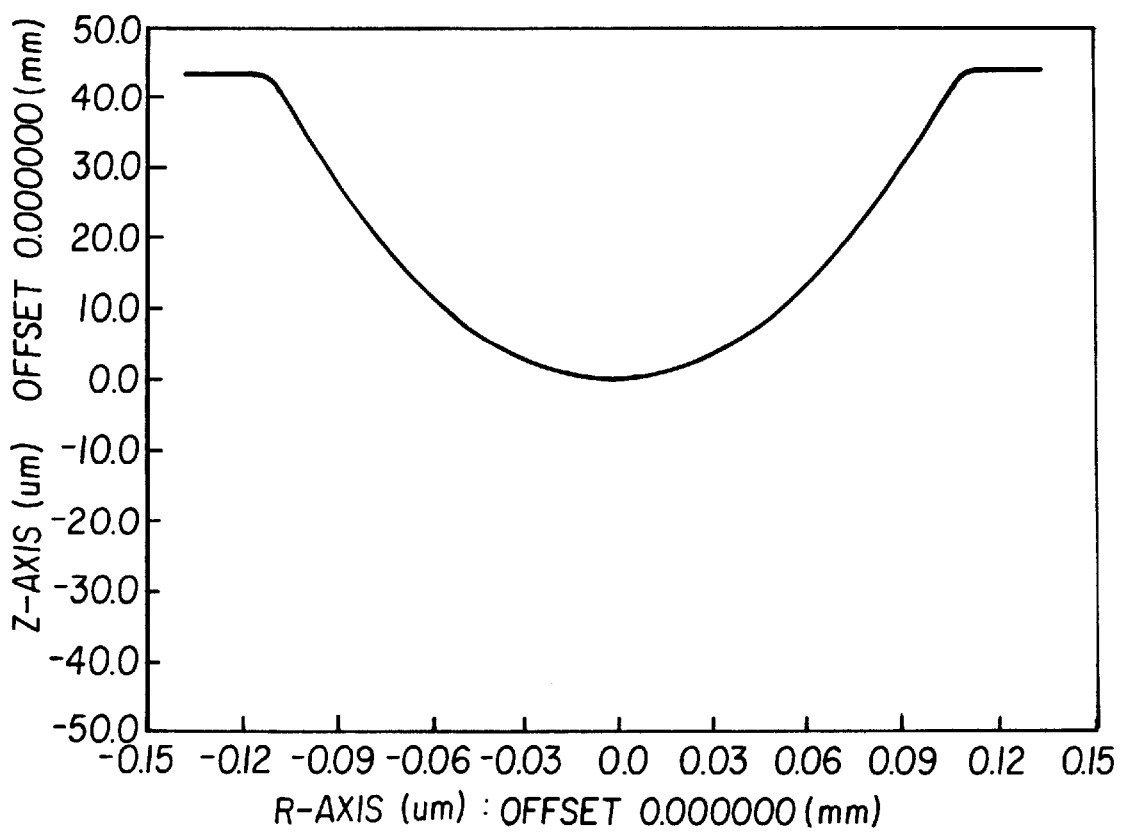
FIG. 8 is a profilometer trace of an optical feature impression made in a mold tool blank that possessed the desired axial viscosity gradient.

In the practice of the method of the present invention the viscosity of the mold tool blank 32 at the mold surface 40 thereof needs to be soft enough to allow impressions to be formed therein while still being firm enough to limit deformation which would result from sagging of the material. The viscosity needed in this region can be determined empirically or by the size and depth of the impression to be made in mold surface 40 with indenter tool or punch 10. For this invention, a viscosity of about $10^{9.17}$ poise was found to be sufficient. It is believed that a viscosity proximate the mold surface 40 in the range of from about $10^{8.98}$ to about $10^{9.35}$ will be adequate for the purposes of practicing the method of the present invention. If the viscosity of the mold tool blank 32 is higher than necessary, the optical feature 44 will be formed with mushrooming defects 43 in the mold surface 40 about the periphery of the optical feature 44 as shown in FIG. 7. If the viscosity level is higher yet, cracking and catastrophic failure may occur. When the viscosity is maintained at the proper level, an optical feature will be formed in the surface 40 without defects as evidenced by the profilometer trace of such an optical feature 46 as shown in FIG. 8. In order to accomplish this the temperature at the base of the mold tool blank 32 must be greater than the temperature at the surface 40 of the mold tool blank 32. In other words, achieving the desired axial thermal gradient in mold tool blank 32 produces the desired viscosity profile.

By way of example, the method of the present invention was successfully demonstrated using a mold tool blank 32 having a length of 15 mm wherein the forming surface 40 of the mold tool blank 32 was 35 mm from one end of a coil 34. The induction coil 34 was a six turn induction coil made from 6 mm diameter copper tubing spaced at a 10 mm pitch for a total coil length of 56 mm. An RF generator was used at a frequency of 154 kHz to create the magnetic field and was sufficient to produce the desired result. A viscosity of about $10^{9.17}$ poise was achieved at the mold surface 40 while simultaneously producing a viscosity of about $10^{8.26}$ poise at the base of mold tool blank 32. It is believed that a viscosity proximate the an end of the mold tool blank 32 opposite the mold surface 40 in the range of from about $10^{8.07}$ to about $10^{8.44}$ will be adequate for the purposes of practicing the method of the present invention. The viscosity proximate the mold surface 40 is, of course greater than the viscosity proximate the an end of the mold tool blank 32 opposite the mold surface 40 as a result of achieving the desired viscosity gradient in the mold tool blank 32. This viscosity profile allowed the displaced glass to flow at a location away from the impression (resulting in the formation of optical feature 46) since the base of mold tool blank 32 was more than 8 times more fluid than the mold surface 40.

It is necessary during the molding process to always maintain a mold tool blank 32 viscosity above the softening point, which is the temperature at which glass articles begin to deform under their own weight. That temperature is defined as the temperature at which the glass attains a viscosity of $10^{7.6}$ poise. The glass should also be free from restrictions in order to allow it to flow at some remote location, and therefore, an annular channel 50 is provided about the base of the mold tool blank 32 for that purpose. Annular channel 50 is defined by the difference between the height of the support plate 30 and the support plate bore 28. When the tooling is actuated to drive the punch 10 into the mold surface 40 of mold tool blank 32, there is no relative movement between the lower mold support 24, support plate 30, and mold tool blank 32. A small flange may be evidenced along the base of the mold tool after forming optical feature(s) 46 in the mold tool blank 32 if sufficient glass has been displaced. This results from the differential heating of the glass (producing an axial thermal gradient) and the material displaced by the indenter tool or punch 10, particularly if a substantial number of optical feature(s) are formed.

Figure 9:
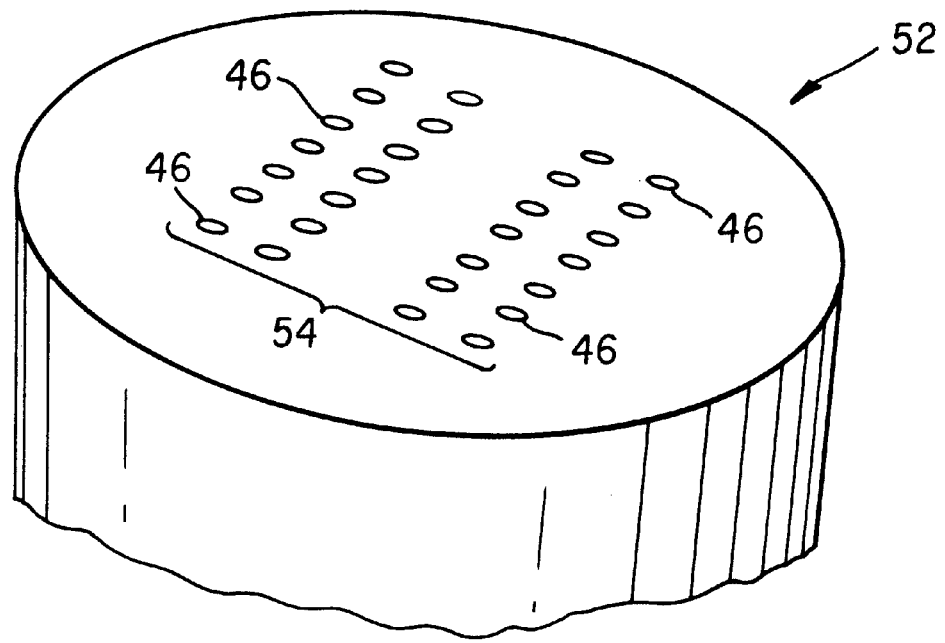
FIG. 9 is a perspective view of mold tool formed with the process of the present invention.

Although the method of the present invention can be practiced with multiple punches 10 to simultaneously form multiple optical feature(s) 46 in a mold tool blank 32, it is preferable that a single forming tool or punch 10 be used in the manufacture of an exemplary mold tool 52 (see FIG. 9) having an array 54 of optical feature(s) 46 formed therein. This will ensure consistency of form between the optical feature(s) 46 and therefore, between the lenses molded with the mold tool 52. Further, using a single indenter tool 10 to manufacture a mold tool 52 having an array 54 of optical feature(s) 46 allows for adaptations and changes in the array pattern with out the expense of costly tooling changes.

The method of the present invention is intended for use with lens glasses that possess a high working temperature, but is suitable for all optical quality glasses. It is not entirely clear where the distinction is made between low and high temperature glasses in the prior art literature, but most people familiar with the art would agree that lens glasses having viscosity curves where the viscosity reaches $10^{4.0}$ poises at or above 750° C. are considered to be in the high temperature regime. When working in this temperature range, material choice is paramount to realizing a successful and robust manufacturing process as many materials begin to break down in some fashion or another. Many materials that are readily coined at room temperature, such as nickel, will suffer degradation at elevated temperatures. Alternately, many materials that perform well at high temperatures, such as silicon carbide, do not lend themselves to coining at room temperature or at elevated temperatures. In the present invention, the forming operation is performed at an elevated temperature slightly above the transformation temperature of the glass since the glass cannot be pressed at room temperature without sustaining severe damage.

In the practice of the present invention, the amount of soak time employed during heating of the mold tool blank 32 can also be controlled. This allows the viscosity to be controlled in a radial direction as well during formation of the optical features 46 in the mold tool blank 32. As a heat source is continually applied to an object over time, the temperature gradient that is initially formed in the object decreases to some minimum value based on properties integral to the material. By controlling the amount of soak time, the proper molding temperature can be achieved for any location on or within the mold tool blank 32. This parameter also has a direct effect on the final shape of the formed optical features, and is important when forming multi-element arrays whose elements may not be equidistant from the heat source.

Figure 10:
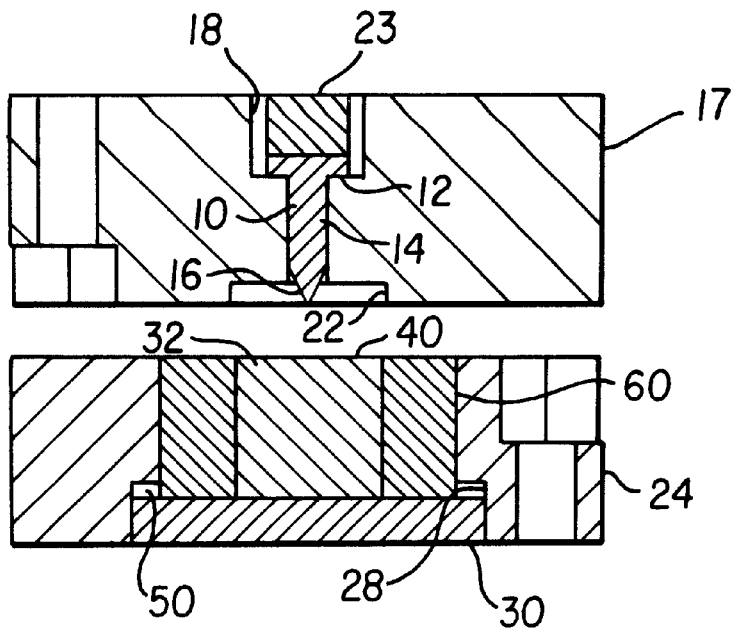
FIG. 10 is a cross-sectional view of an alternative mold assembly from that shown in FIG. 1 which can be used in the process of the present invention for forming the optical features into the mold tool blank.

In an alternative embodiment of the method of the present invention, an intermediate ring 60 is used in the molding operation to surround the mold tool blank 32 (see FIG. 10). The intermediate ring 60 (which is a cylindrical structure) is fabricated from a material that can be machined to a good quality finish and possesses a low thermal conductivity, such as $SiO_2$ or a ceramic. This intermediate ring 60 serves to insulate the mold tool blank 32 from energy fluctuations generated by the heat source.

Figure 11:
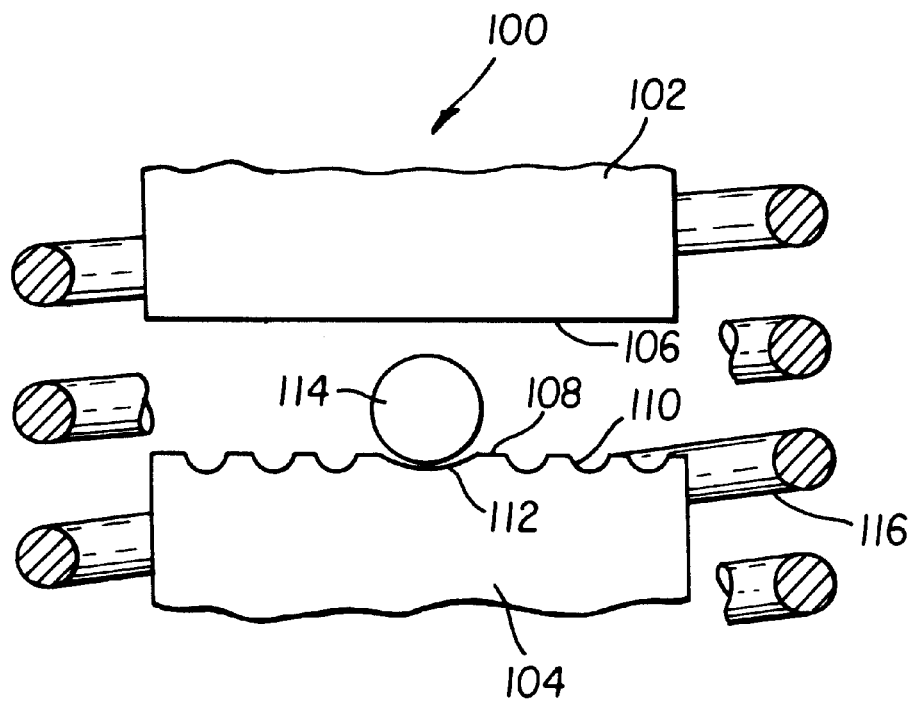
FIG. 11 is a cross-sectional schematic of an apparatus which employs mold tools formed with the method of the present invention to mold micro-optical elements therewith.

Turning to FIG. 11, there is shown a cross-sectional schematic of an apparatus which employs mold tools formed with the method of the present invention to mold micro-optical elements therewith. The apparatus 100 is described in greater detail in U.S. application Ser. No. 09/354,219 filed Jul. 15, 1999 which is hereby incorporated herein by reference. The apparatus 100 includes an upper mold tool 102 and a lower mold tool 104. Lower mold tool 104 is one example of mold tool 52 shown in FIG. 9. The upper mold half 102 includes an upper mold surface 106. Upper mold surface 106 is depicted as being plano but may include other optical geometries of such as concave or convex features. The lower mold tool 104 includes an array of optical feature(s) or micro-lens cavities 110 formed in mold surface 108. The optical feature(s) or micro-lens cavities 110 are spaced apart from a central nesting cavity 112 which provides residence for a preform 114 which is depicted as being spherical. Surrounding upper and lower mold tools 102 and 104 is induction heating coil 116. In operation, a preform 114 is placed in central nest cavity 112 and through actuation of induction heating coil 116, the temperature of the upper and lower mold tools 102, 104 and preform 114 is raised to at least the glass transition temperature of the preform 114. Then the preform 114 is pressed between the upper and lower mold tools 102, 104 causing the preform 114 to deform and flow generally radially outward. As the preform flows radially outward, it fills the optical feature(s) or micro-lens cavities 110. Compression is performed to a positive stop at which point the mold tools 102, 104 and the preform 114 are allowed to cool to below the glass transition temperature and preferably to below the annealing point of the glass. In such manner, an integrally formed array of lenses or micro-lenses (not shown) is formed which can then be removed from the molding apparatus 100. It should be understood that upper and lower mold tools 102, 104 are not necessarily directly heated by induction. Rather, upper and lower mold tools 102, 104 preferably reside in a mold body (not shown) fabricated from a conductive material such as graphite or molybdenum. The mold body is heated by the induction field and the upper and lower mold tools 102, 104 are heated indirectly by conduction and radiant heat transfer.

Although preform 114 is depicted as being spherical, it is well known to those skilled in the art that preforms can have other geometries. Those other geometries are generally necessitated by the final geometry of the optical element to be formed therefrom. Thus, for example, if it is desired to form a double concave lens, then it will likely be desirable to use a plano preform.

It should be recognized that the preferred method of the present invention of using a single tool to press features while relying on external means to properly place the tool onto the mold eliminates the high set up costs associated with the prior art. In addition, using a single movable indenter tool allows for varying the spacing between lenses to accommodate different designs without generating new tools.

It should also be appreciated that the method of the present invention does not bring the glass of the mold tool blank to the melting point but rather to just the softening point of the glass. This is important since it eliminates concerns about devitrification of the glass, or the effects of forming an incomplete or inconsistent interface.

From the foregoing, it will be seen that this invention is one well adapted to obtain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

Parts List 10 indenter tool/punch
12 flange portion
14 shank portion
16 optical quality pressing surface
17 upper mold support
18 flange bore
20 shank bore
22 preform bore
23 back up spacer element
24 lower mold support
26 preform bore
28 support plate bore
30 support plate
32 mold tool blank
34 induction heating coil
36 resistance heater module
38 radiant heater
40 mold surface
43 mushrooming defects
44 optical feature
46 optical feature(s)
50 annular channel
52 exemplary mold tool
54 array
60 intermediate ring
100 apparatus
102 upper mold tool
104 lower mold tool
106 upper mold surface
108 mold surface
110 micro-lens
112 central nesting cavity
114 preform
116 induction heating coil

What is claimed is:

1. A method for fabricating mold tools for molding optical elements comprising the steps of:
   (a) heating a mold tool blank made from a vitreous material to a temperature above a transition temperature of the vitreous material;
   (b) generating an axial thermal gradient in the mold tool blank which translates into an axial viscosity gradient;
   (c) pressing a punch into an optical quality mold surface of the mold tool blank, the punch including a pressing surface with a predetermined geometry; the pressing surface having a release coating thereon;
   (d) cooling the mold tool blank to a temperature below the transition temperature of the material; and
   (e) removing the punch from the mold tool blank.

2. A method as recited in claim 1 wherein:
   the axial viscosity gradient results in a first viscosity proximate the optical quality mold surface of the mold tool blank which is higher than a second viscosity proximate an end of the mold tool blank opposite the optical quality mold surface.

3. A method for fabricating mold tools for molding optical elements comprising the steps of:

(a) heating a mold tool blank made from a vitreous material to a temperature above a transition temperature of the vitreous material;
(b) generating an axial viscosity gradient in the mold tool blank;
(c) pressing a punch into an optical quality mold surface of the mold tool blank, the punch including a pressing surface with a predetermined geometry for forming an optical feature;
(d) cooling the mold tool blank to a temperature below the transition temperature of the material; and
(e) removing the punch from the mold tool blank thereby creating the optical feature in the optical quality mold surface.

4. A method as recited in claim 3 wherein:
said generating step is performed by creating an axial thermal gradient in the mold tool blank.

5. A method as recited in claim 4 further comprising the step of:
molding at least one optical element with the mold tool.

6. A method as recited in claim 3 wherein:
said heating step is performed with an induction heating coil.

7. A method as recited in claim 3 wherein:
said heating step is performed with a resistance heater.

8. A method as recited in claim 3 wherein:
said heating step is performed with a radiant heater.

9. A method as recited in claim 3 further comprising the steps of:
(a) maintaining the axial viscosity gradient in the mold tool blank; and
(b) repeating said pressing, cooling and removing steps to form multiple optical features in the optical quality mold surface.

10. A method as recited in claim 9 further comprising the step of:
molding optical elements with the optical quality mold surface of the mold tool.

11. A method as recited in claim 3 further comprising the step of:
controlling the viscosity of the vitreous material radially in the mold tool blank.

12. A method as recited in claim 3 further comprising the step of:
confining a cylindrical surface of a mold tool blank in a mold support during said heating, generating, pressing, cooling and removing steps.

13. A method as recited in claim 12 further comprising the step of:
providing a channel proximate an end of the mold tool blank opposite the optical quality surface to allow flow of the vitreous material therein.

14. A method as recited in claim 3 wherein:
the axial viscosity gradient results in a first viscosity proximate the optical quality mold surface of the mold tool blank which is higher than a second viscosity proximate an end of the mold tool blank opposite the optical quality mold surface.

15. A method as recited in claim 3 wherein:
said step of generating an axial viscosity gradient produces in the mold tool blank a viscosity in the range of from about $10^{8.98}$ poise to about $10^{9.35}$ poise at the optical quality mold surface of the mold tool blank while simultaneously producing a viscosity in the range of from about $10^{8.07}$ poise to about $10^{8.44}$ poise at a base of the mold tool blank opposite the optical quality mold surface.

16. A method for fabricating mold tool for molding optical elements comprising the steps of:
(a) heating a mold tool blank made from a vitreous material to a temperature above a glass transition temperature of the vitreous material to achieve a viscosity in the range of from about $10^{8.98}$ poise to about $10^{9.35}$ poise at a forming surface of the mold tool blank while simultaneously producing a viscosity in the range of from about $10^{8.07}$ poise to about $10^{8.44}$ poise at a base of the mold tool blank;
(b) pressing a punch into an optical quality mold surface of the mold tool blank, the punch including a pressing surface with a predetermined geometry; the pressing surface having a release coating thereon;
(c) cooling the mold tool blank to a temperature below the glass transition temperature of the material; and
(d) removing the punch from the mold tool blank thereby creating a mold tool.

17. A method as recited in claim 16 wherein:
during said heating step a viscosity of about $10^{9.17}$ poise is achieved at or proximate to the forming surface while simultaneously producing a viscosity of about $10^{8.26}$ poise at or proximate to the base of mold tool blank.

18. A method for fabricating mold tools for molding optical elements comprising the steps of:
(a) confining a cylindrical surface of a mold tool blank made from a vitreous material in a mold support;
(b) heating the mold tool blank to a temperature above a glass transition temperature of the vitreous material;
(c) generating an axial viscosity gradient in the mold tool blank such that the viscosity of the vitreous material is higher at a forming surface of the mold tool blank and lower at an end of the mold tool blank opposite the forming surface;
(d) pressing a punch into an optical quality mold surface of the mold tool blank, the punch including a pressing surface with a predetermined geometry; the pressing surface having a release coating thereon;
(e) cooling the mold tool blank to a temperature below the glass transition temperature of the material; and
(f) removing the punch from the mold tool blank thereby creating a mold tool.

19. A method as recited in claim 18 wherein:
the axial viscosity gradient results in a first viscosity proximate the optical quality mold surface of the mold tool blank which is higher than a second viscosity proximate an end of the mold tool blank opposite the optical quality mold surface.

20. A method as recited in claim 18 wherein:
said step of generating an axial viscosity gradient produces in the mold tool blank a viscosity in the range of from about $10^{8.98}$ poise to about $10^{9.35}$ poise at the optical quality mold surface of the mold tool blank while simultaneously producing a viscosity in the range of from about $10^{8.07}$ poise to about $10^{8.44}$ poise at a base of the mold tool blank opposite the optical quality mold surface.

* * * * *